Jan. 18, 1949.　　　I. S. PRETTYMAN ET AL　　　2,459,738
CORD TESTING APPARATUS

Filed Oct. 20, 1943　　　　　　　　　　　　　　2 Sheets-Sheet 1

Inventor
IRVEN S. PRETTYMAN
GEORGE P. BOSOMWORTH
DUNCAN C. MILNER

By Ely & Frye

Attorneys

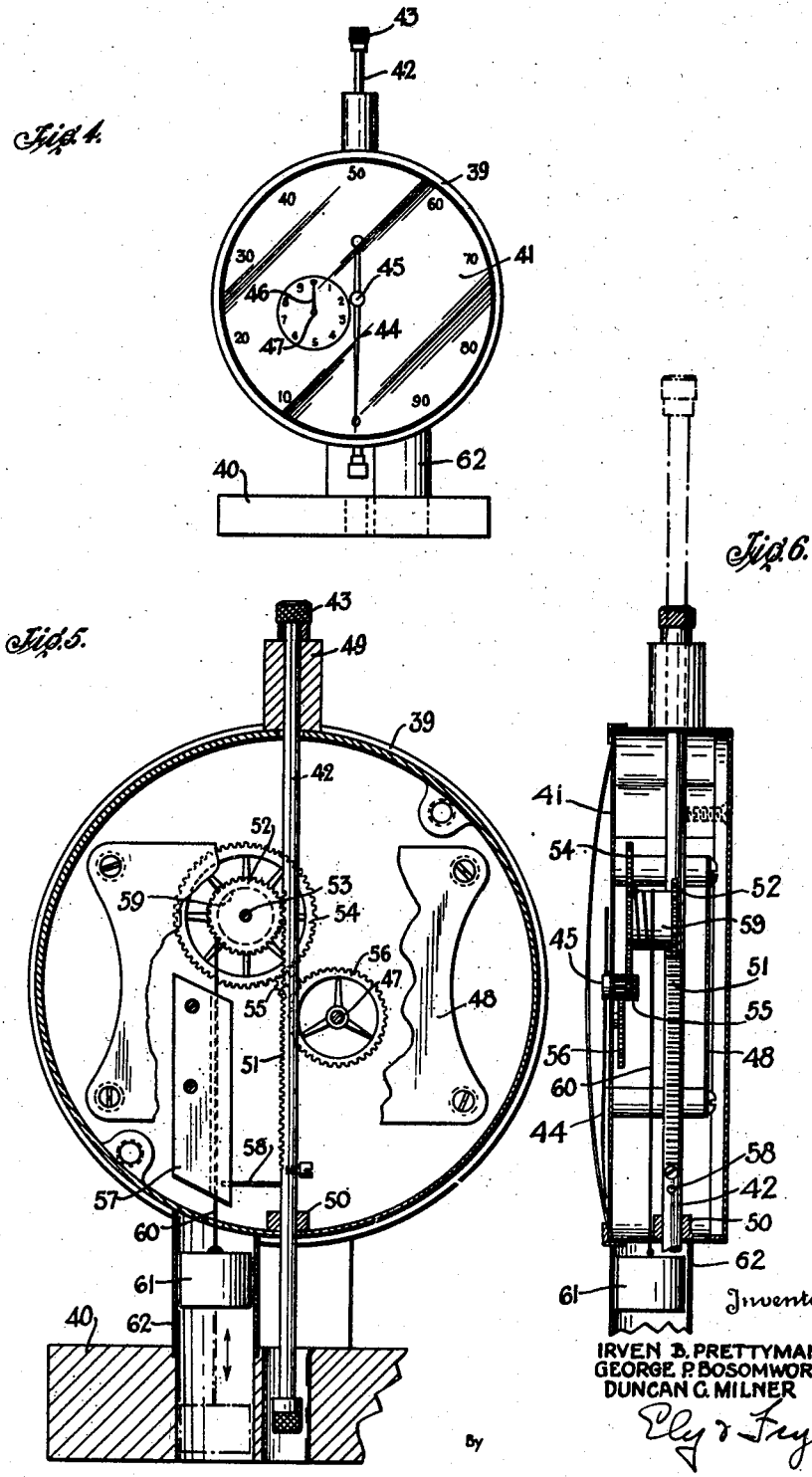

Patented Jan. 18, 1949

2,459,738

UNITED STATES PATENT OFFICE 2,459,738

CORD TESTING APPARATUS

Irven B. Prettyman and George P. Bosomworth, Akron, and Duncan C. Milner, Barberton, Ohio, assignors to The Firestone Tire & Rubber Company, Akron, Ohio, a corporation of Ohio Application October 20, 1943, Serial No. 507,218

1 Claim. (Cl. 73—15.4)

This invention pertains to a mechanism for testing cords or other strands, more especially, a mechanism for determining certain data with respect to the elongation characteristics of these cords or strands. In practicing the invention it is contemplated that several cords be tested at one time, each of them being subjected to a test which is identical, so near as is practicable, to the test applied to each of the other cords. The apparatus has provision for controlling the temperature and humidity in an enclosure within which the greater part of each of the cords is housed.

While the invention is in no way limited to the testing of any particular type of cord or strand, it is especially useful when employed to test cords of various materials such as cotton, rayon, nylon, or any of the other strands or cords of animal, vegetable or synthetic materials. One example of an instance in which data determined with this type machine may be useful is that pertaining to cords to be employed in tires. It is a well-known fact that tires, after a short period of use, grow or increase in size, this being attributed to the inability of the tire cord to maintain a definite length. Apparently, these cords stretch or in some way increase their length after a rather short period of tire use, and in the development of tires and in an attempt to check this tire growth, the present apparatus is used to advantage.

Since the element of time is important so far as these tests are concerned, it is very desirable that extremely accurate measurements be taken at frequent intervals. To this end, a dial gauge type of measuring instrument has been developed especially for use with this testing mechanism. Normally such gauges are so constructed that in using the gauge, an increasing resistance is brought into play as the central staff of the gauge is pressed inwardly, that is, the smaller the dimension to be measured, within the latitude provided by the instrument, the greater the resistance offered by the instrument itself. In measuring elongation of cords, such a gauge has been found to be of little use since, for short periods of time, the elongation to be measured is very minute. For accurate results a gauge of this general type has been reconstructed in such a way that the amount of resistance offered to movement of the central staff is extremely slight and that resistance does not vary at any point throughout the entire travel or movement for which the instrument is designed.

The invention will be described by reference to a preferred embodiment of the same and in conjunction with the accompanying figures of drawing in which:

Fig. 4 is an elevation of a dial gauge according to the invention;

Fig. 5 is a partial section of this dial gauge, double size, showing details of the entire mechanism; and Fig. 6 is a transverse section through the upper part of the dial gauge.

Figure 2:
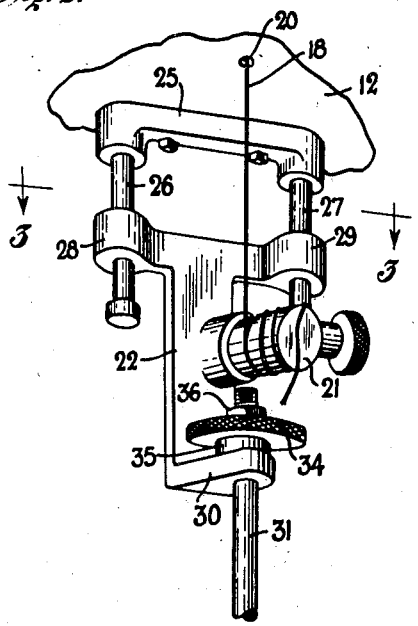
Fig. 2 is a detailed view of one of the lower cord clamping or retaining elements.
Figure 1:
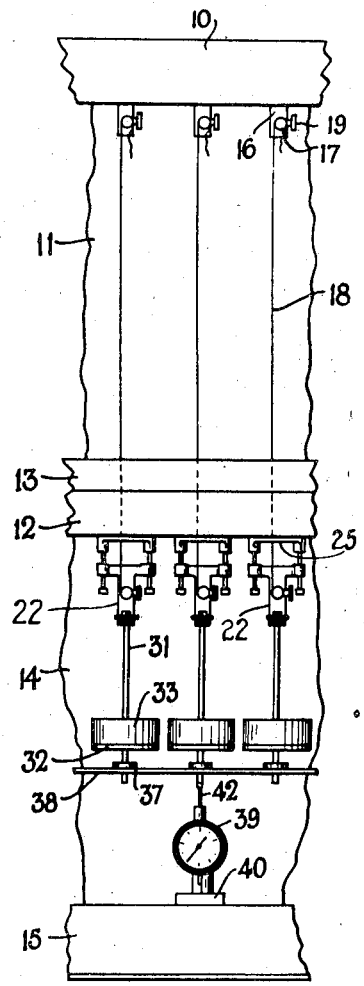
Fig. 1 is a front plan view of a section of the machine showing cords being subjected to elongation and a dial gauge in place for taking a measurement.
Figure 3:
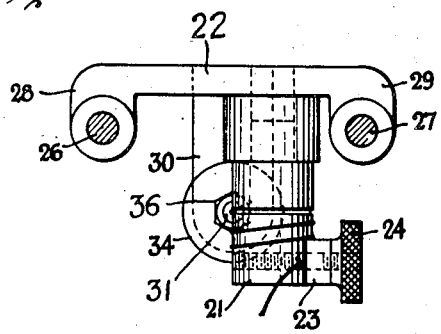
Fig. 3 is a section at line 3—3, Fig. 2.

Now referring to Figs. 1, 2 and 3, the testing apparatus is generally constructed as an enclosure or casing having upper and lower compartments, the upper compartment, at least, being closed when desired and communicating with the lower compartment only by a series of rather small openings through which the cords or strands are threaded. The upper compartment has a top 10, back 11 and a central, dividing bulkhead 12 which is really the lower portion or floor of the upper compartment. The upper compartment has doors (not shown) which close tightly against the ends, top section 10 and a sill 13. The lower compartment which is not necessarily to be enclosed has a back 14 and a base 15, the latter being level and machined to present a smooth, true surface from which measurements may be taken.

The top section 10 has attached thereto for each of the cords a clamping device which consists of a depending bracket 16 from which projects a snubbing post 17 about which a cord 18 is wrapped for two or three turns and having a clamp for securing the end of the cord as an adjusting or clamping screw 19 is tightened. The details of this clamp are similar to that of the lower clamps such as shown in Fig. 3 and which will be described in greater detail in due course.

The cord 18 is threaded down through an eyelet or opening 20 in the bulkhead 12 and is in turn wrapped or snubbed about the post 21 projecting outwardly from a sliding element, generally indicated by numeral 22, and which is in fact a combined cord holder and weight carrier. The post 21 is grooved to receive the cord 18 in alignment with the opening 20 so that there will be no frictional contact between that cord and the sides of the opening. As shown in both Figs. 2 and 3, the cord, after passing around at least a part of the groove, is snubbed about the post and has its end clamped by a clamping piece 23 which is tightened into position by the knurled thumb nut 24. This clamping means and that at post 17 are preferably identical.

A bracket 25 attached by any suitable means to the lower side of bulkhead 12 has depending vertically downward, the spaced rods 26 and 27 by which the sliding element 22 is guided and maintained in accurate vertical alignment as the same is moved under the influence of a depending weight and as the cord or strand allows such movement by its elongation.

This sliding element 22 has laterally projecting ears 28 and 29 which have holes therein accurately machined for engagement with the rods 26 and 27 thereby providing for true vertical movement without any appreciable friction. The sliding element 22 also has a forwardly extending projection 30 to which is attached a rod 31 having a weight supporting disc or plate 32 on which is supported a weight 33. Each of these rods 31 is held in position and is adjustable vertically by means of the large thin adjusting disc 34. This disc bears upon a washer 35 and a hex nut 36 may be used to lock the adjusting disc 34 in position.

Each of the rods 31 projects down through a guide 37 in a plate 38, said plate extending the length of the lower compartment. It can be seen that there is really a three point sliding engagement for the combined cord clamping and weight carrying mechanism. Thus it is maintained vertically in position and its movement as the cord extends under load, must be in a true vertical direction and with as little friction as is practicably possible.

The top 10 of the upper compartment, bulkhead 12, plate 38 and the top machined surface of the base or floor 15 for the lower compartment are all horizontal and thus truly parallel to each other. That is important since when measurements are taken by a dial gauge or other measuring device, that gauge may be slid along the machined surface which serves as a reference point or base from which accurate measurements may be taken. In setting up the machine for test purposes, cords are clamped in position so that each of the sliders 22 will be in practically the same horizontal plane, in other words, the initial setup is such that the same length of cord is to be tested at each station. By adjusting the rods 31 so that the lower ends thereof will initially show the same measurement on the gauge, the operator is thereby able to start the test with a common reading at each of the stations after which variations or elongation can be measured and directly compared to the initial indication.

Referring to Figs. 4, 5 and 6, a dial gauge of new design will be described, that gauge being especially adapted for use in connection with cord testing as described herein. The gauge generally includes a case 39 supported on a base 40, a graduated face 41 and a central staff 42 at the end of which is a hardened contact element 43. The staff 42 is, of course, movable so that a measurement can be taken between the lower machined and ground surface of the base of the instrument and the end of the contact element 43. The range of movement for the staff and therefore the range through which measurements may be taken is, in this particular instance, one inch, but that is only by way of example and in machines of different sizes or for different purposes, it may well be desired to provide a measuring instrument having a greater range. The outer portion of the face is indexed so that a pointer 44 rotatable on the central pivot 45, may indicate measurements to a thousandth of an inch. A smaller pointer 46 rotatable on pivot 47 shows tenths of an inch so that variations in elongation up to an inch may be indicated, the smallest increment of variation shown by this particular instrument being a thousandth. Of course, smaller increments may be measured by an alteration in gearing and indexing.

Now referring to Fig. 5, the back of the case has been removed and part of plate 48 is cut away. The central staff is in lower position and the same is guided in the bearings 49 and 50. Rack teeth 51 are cut at one side of the staff 42 and those teeth mesh with similar teeth in a pinion 52 fixed to pivot 53 on which is also fixed a larger gear 54. The gear 54 meshes with a small pinion 55 which is really cut on the spindle 45, centrally located, and which carries pointer 44. A gear 56 fixed to the pivot or spindle 47 which carries a small pointer 46 has ten times as many teeth as are provided on pinion 55. As the staff 42 is moved vertically, the movement thereof is transferred through the gearing just described to the pointers 44 and 46. The ratio of this gearing and indexing is such that for a movement of one thousandth of an inch for the staff, pointer 44 will indicate that amount of movement at the face of the instrument. The small pointer 46 receives one tenth of the angular movement imparted to pointer 44 and thus for every hundred thousandths of an inch, that is, for each complete rotation of pointer 44, the small pointer 46 will move one tenth of its complete arc of movement or will indicate one hundred thousandths or one tenth of an inch. In this way, a measurement can be taken in which the pointer 44 makes several revolutions on its dial or face, the number which it has made being indicated by the small pointer 44 and the graduations on the smaller scale.

A guide 57 has a slot running lengthwise therewithin which a pin 58 projects, said pin extending from the side of the staff at which the rack teeth are cut. That prevents rotation of the staff on its own axis and thus maintains the rack teeth in proper meshing relationship to the pinion 52.

A drum 59, Fig. 6, has a very fine wire strand 60 wound thereon and fixed at one end, this wire strand attaching at its other end to a weight 61. The weight 61 is just sufficient to counter-balance the weight of the central staff and its attached parts so that, except for friction, the instrument does not offer any resistance to the movement of the staff in the taking of a measurement. This weight is enclosed within a well defined by a sleeve 62 running from the case to the base in which is drilled an opening of the same diameter as the internal diameter of the sleeve. The wire cord is also guided within the slot cut in the element 57.

Different weights 33 may be used depending upon the size of cords to be tested and other considerations, these weights being quickly detachable in a manner similar to weights used for platform type scales. In some tests it may not be desirable to vary or control the temperature or humidity of the atmosphere to which the cords are subjected. If it is important, those factors are controllable by circulating heated air through the upper compartment and controlling the humidity of that air in a manner not necessarily described in this application.

Cords may be subjected to elongation over any prescribed period of time and, as before stated, the apparatus may be used for testing cords or strands of any known material. In this specification a more or less specific description has been given as applied to a preferred embodiment of the invention, but variations and modifications will occur to those skilled in the art and obviously would fall within the scope of the invention as originally conceived. The invention is defined in the appended claim.

We claim:

A cord testing machine of the class described including means for simultaneously testing a plurality of cords under substantially identical conditions, said means comprising a closed compartment having means for circulation of heated air therethrough and control of humidity therein, a plurality of cord clamping members attached to the top portion of the compartment and a corresponding number of cord clamping members disposed below the floor of said compartment, said clamping members being arranged in pairs of an upper and a lower clamp adapted to anchor the end portions of a cord extending therebetween, the bottom wall of said compartment having small holes therethrough through which holes the lower portion of the cords being tested extend, the clamps disposed below said floor, each comprising two spaced parallel vertical rods upon which a test weight element is slidably mounted, said weight elements each having a depending vertical adjustable rod having weight receiving means thereon, said depending rods projecting downwardly through a guide plate below said weight receiving means.

IRVEN B. PRETTYMAN.
GEORGE P. BOSOMWORTH.
DUNCAN C. MILNER.

REFERENCES CITED

The following references are of record in the file of this patent:

UNITED STATES PATENTS

| Number | Name | Date |
|---|---|---|
| 1,653,168 | Green | Dec. 20, 1927 |
| 1,917,597 | Nessler | July 11, 1933 |
| 2,061,261 | Walter | Nov. 17, 1936 |
| 2,142,741 | Zacharia | Jan. 3, 1939 |
| 2,157,092 | Allen et al. | May 9, 1939 |
| 2,217,080 | Ruch | Oct. 8, 1940 |
| 2,240,505 | Lessig | May 6, 1941 |
| 2,279,368 | Dietert | Apr. 14, 1942 |